(12) United States Patent
Villaume et al.

(10) Patent No.: US 8,209,072 B2
(45) Date of Patent: Jun. 26, 2012

(54) METHOD AND DEVICE TO ASSIST IN THE PILOTING OF AN AIRCRAFT IN A LANDING PHASE

(75) Inventors: Fabrice Villaume, Seysses (FR); Armand Jacob, Pibrac (FR); Robert Lignee, Tournefeuille (FR)

(73) Assignees: Airbus Operations SAS, Toulouse (FR); Airbus, Blagnac (FR)

( * ) Notice: Subject to any disclaimer, the term of this patent is extended or adjusted under 35 U.S.C. 154(b) by 362 days.

(21) Appl. No.: 12/051,803

(22) Filed: Mar. 19, 2008

(65) Prior Publication Data

US 2008/0234882 A1  Sep. 25, 2008

(30) Foreign Application Priority Data

Mar. 20, 2007  (FR) .................................... 07 01996

(51) Int. Cl.
*G06G 7/70* (2006.01)

(52) U.S. Cl. ......... 701/16; 701/4; 701/5; 701/6; 701/14; 701/15; 701/18; 701/17; 701/122; 340/947; 340/948; 340/951; 340/979; 340/980

(58) Field of Classification Search .................. 701/3–6, 701/14–18, 120, 122, 301; 340/945, 947, 340/948, 951, 961, 972, 958, 979, 980; 342/454, 959, 357.08, 967, 29; 707/10, 200; 382/103
See application file for complete search history.

(56) References Cited

U.S. PATENT DOCUMENTS

| | | | |
|---|---|---|---|
| 6,304,800 B1 * | 10/2001 | Ishihara et al. | 701/16 |
| 7,014,146 B2 | 3/2006 | Villaume | |
| 7,085,630 B2 * | 8/2006 | Ryan et al. | 701/16 |
| 7,702,461 B2 * | 4/2010 | Conner et al. | 701/301 |
| 2004/0026992 A1 | 2/2004 | Villaume | |
| 2005/0006524 A1 | 1/2005 | Villaume | |
| 2005/0192739 A1 * | 9/2005 | Conner et al. | 701/120 |

FOREIGN PATENT DOCUMENTS

| | | |
|---|---|---|
| EP | 1 496 413 | 1/2005 |
| FR | 2 817 979 | 6/2002 |
| FR | 2 857 468 | 1/2005 |

OTHER PUBLICATIONS

Preliminary Search Report dated Oct. 30, 2007.

* cited by examiner

*Primary Examiner* — Thomas Tarcza
*Assistant Examiner* — Adam Tissot
(74) *Attorney, Agent, or Firm* — Dickinson Wright PLLC (57) ABSTRACT

A method and device to assist in the piloting of an aircraft in a landing phase may apply a maximum braking of the aircraft if there is a risk of longitudinal departure from a runway.

10 Claims, 3 Drawing Sheets

METHOD AND DEVICE TO ASSIST IN THE PILOTING OF AN AIRCRAFT IN A LANDING PHASE

FIELD OF THE INVENTION

The present invention relates to a method and a device to assist in the piloting of an aircraft, in particular a civilian transport aeroplane, in a landing phase.

BACKGROUND OF THE RELATED ART

It is known that, when taxiing on a runway following a landing, the deceleration (or the braking) of an aircraft is performed either manually and directly by the pilot by using the brake pedals, or via an automatic braking system which servo-controls a deceleration that is fixed and predetermined by the pilot before landing, via a pushbutton or an electromagnetic knob.

Now, these braking systems, whether manual or automatic, have no awareness of the topographic reality of the runway (length, width, etc.) on which the landing is being made.

The documents FR-2 817 979 and FR-2 857 468 disclose devices for automatically controlling the deceleration of an aircraft in the taxiing phase, which partly overcome this drawback. These known devices in fact enable the crew of the aircraft to select an exit ramp from the runway and to automatically and optimally manage (assistance in the selection of an exit ramp that is realistic and compatible with the known landing performance levels, minimizing the runway occupancy time, minimizing the necessary braking energy, improving comfort) the deceleration of the aircraft when taxiing on landing until the selected exit ramp is reached. Consequently, in normal operational conditions, reaching this exit ramp in the optimal way is guaranteed through these standard devices.

SUMMARY OF THE INVENTION

The object of the present invention is, more particularly, to safeguard the aircraft against a risk of longitudinal departure from the runway, when taxiing on this runway during the landing.

It is known that, on a landing, a problem can arise concerning the normality of the landing conditions and how they are managed by the crew of the aircraft. In practice, before undertaking a flight, the crew must check that the landing of the aircraft at the destination airport is possible, that is, that the anticipated landing performance levels, combined with expected exogenous conditions (weather, knowledge of the destination airport, experience of the crew, and so on) are compatible with the length of the runway available at said destination airport.

However, it is possible for the weather conditions to deteriorate at the moment of execution of the landing (appearance of heavy rainfall, strong wind gradients, and so on), then making the landing difficult to perform by the crew until the aircraft stops on the available length of the runway used (or even a speed is achieved which is compatible with taking an exit ramp that the aircraft is expected to take). In such conditions, the risk of longitudinal departure from the runway becomes greater.

Now, this risk of departure from a runway is currently entirely managed by the crew, with no assistance, nor any automatic functionality, using its experience, its training and a good preliminary flight preparation, which is not satisfactory.

The object of the present invention is to remedy these drawbacks. It relates to a method to assist in the piloting of an aircraft in a landing phase, which makes it possible to safeguard the aircraft against a risk of longitudinal departure from a runway when taxiing on this runway on landing.

To this end, according to the invention, said method is noteworthy in that:
 a) in the landing phase, a runway of the airport which is provided with a plurality of runways is automatically determined;
 b) characteristics of the runway determined in the step a) are determined;
 c) the current longitudinal position of the aircraft in a reference frame linked to said determined runway is repetitively determined; and
 d) immediately the aircraft passes the threshold of said determined runway:
  d1) a longitudinal stopping position of the aircraft is determined from said current longitudinal position;
  d2) this longitudinal stopping position is compared to the length of said determined runway; and
  d3) if said longitudinal stopping position is greater than the length of said determined runway (that is, if the stopping of the aircraft occurs, longitudinally, downstream of the downstream end of the runway), and as long as such is the case, a maximum braking of the aircraft is applied.

Preferably, in the step d3), in this case at least one alarm (visual and/or vocal) is also issued.

Thus, with the invention, if there is a risk of longitudinal departure from the runway that has been determined and is actually used (that is, when the longitudinal stopping position of the aircraft is greater than the length of this runway), a maximum possible braking of the aircraft is applied, according to the characteristics of said aircraft, so as to avoid any such longitudinal departure. This maximum possible braking is applied as long as the risk of departure from the runway remains.

According to the invention, this braking can be applied either manually or automatically so that the present invention can be applied to all existing types of braking systems.

If there is a risk of departure from a runway, in a preferred embodiment, an alarm is also issued, in particular to urge the crew to deploy without delay thrust reversers in their most effective position and, when they are deployed, to urge the crew to keep them deployed (as long as the risk remains).

In a particular embodiment, in the step a), the aim of the automatic determination is to confirm a preliminary manual determination of the runway, made by an operator (a member of the aircraft crew).

Furthermore, advantageously, a symbol system (consisting of variable shapes and/or colours) illustrating said longitudinal stopping position is presented on an airport map displayed on a display screen in the cockpit. Furthermore, this symbol system varies according to the difference between said longitudinal stopping position and said length of the determined runway, that is, according to the risk of longitudinal departure from the runway.

Moreover, in a particular embodiment, between the above-mentioned steps c) and d), an intermediate step is performed, consisting in checking that the aircraft is indeed landing on the runway determined in the step a). This intermediate step is applied when the aircraft is at a predetermined radio-altimetric height, for example 500 feet (approximately 150 metres). This intermediate step can, in particular, consist in checking:
 that the angular difference between the magnetic orientation of the determined runway and the current magnetic heading of the aircraft is indeed below a predetermined threshold value, for example 50; or that the metric difference between the lateral position of the aircraft and the axis of the determined runway is indeed less than a predetermined threshold value, for example 300 metres.

Moreover, in a preferred embodiment, in the step a), to automatically determine a runway intended for the landing of the aircraft at said airport provided with a plurality of runways, the following sequence of operations is automatically carried out:

a1) for each of said runways of the airport, the coordinates of the threshold of the corresponding runway, and its orientation, are determined;

a2) a check is repetitively carried out to see if a characteristic height which depends on the current altitude of the aircraft and on the altitude of the airport is located within a (predetermined) height-wise detection window;

a3) immediately said characteristic height is located within said detection window, an angular difference between the geographic orientation of the corresponding runway and a straight line passing both through the current position of the aircraft and the threshold of this runway is repetitively computed for each of said runways, by taking into account the information determined in the step a1), these angular differences being computed for each runway repetitively, and this until said characteristic height is once again located outside of said detection window; and a4) at this moment, one of said runways is determined by taking into account the various angular differences computed in the step a3).

In this case, advantageously, in the step a1), the orientation of a runway is determined from latitude and longitudinal coordinates of the threshold (or upstream end) of this runway and latitude and longitude coordinates of the end (or downstream end) of this runway.

Furthermore, advantageously, in the step a2):

the characteristic height is determined, by determining the median value of the following values: Hp-Ha, Hra and H0, with:

Hp being the current baro-inertial altitude of the aircraft;

Ha being the altitude of the airport;

Hra being the current radio-altimetric altitude of the aircraft; and

H0 being a predetermined height value; and a check is made to ensure that this characteristic height is located within said detection window which is delimited by two predetermined minimum and maximum height values.

Furthermore, advantageously, in the step a3), said angular difference is computed for any runway of index k, by taking into account an orientation θAMk which is computed from the following expressions:

-if $\sin(\mu AC - \mu THRk) < 0$, $$\theta AMk = \arccos\left(\frac{\sin(\lambda AC) - \sin(\lambda THRk) \cdot \cos(\rho AMk)}{\sin(\rho AMk) \cdot \cos(\lambda THRk)}\right)$$

-otherwise, $\theta AMk = 2\pi - \arccos\left(\frac{\sin(\lambda AC) - \sin(\lambda THRk) \cdot \cos(\rho AMk)}{\sin(\rho AMk) \cdot \cos(\lambda THRk)}\right)$ -continued $$-\rho AMk = 2R \cdot \arcsin\sqrt{\sin^2\left(\frac{\lambda THRk - \lambda AC}{2}\right) + \cos(\lambda THRk) \cdot \cos(\lambda AC) \cdot \sin^2\left(\frac{\mu THRk - \mu AC}{2}\right)}$$

in which:

λTHRk and μTHRk are the latitude and longitude coordinates of the threshold of said runway of index λAC and μAC are the current latitude and longitude coordinates of the aircraft; and R is the radius of the Earth.

Furthermore, advantageously, in the step a4):

the cumulative average is computed, for each runway, of all the corresponding angular differences computed in the step a3);

the various duly computed cumulative averages are compared with each other; and the runway is determined as the one whose cumulative average is the lowest.

The present invention also relates to a system to assist in the piloting of an aircraft, in particular a civilian transport aeroplane, to assist in the piloting in a landing phase at an airport which is provided with a plurality of runways.

According to the invention, said system is noteworthy in that it comprises:

an automatic determination device for automatically determining, in the landing phase, one of said airport runways;

means for providing characteristics of the determined runway;

means for determining the current longitudinal position of the aircraft in a reference frame linked to said determined runway;

means for determining, immediately the aircraft passes the threshold of said determined runway, from said current longitudinal position, a longitudinal stopping position of the aircraft;

means for comparing this longitudinal stopping position with the length of said determined runway; and means for applying a maximum braking of the aircraft, if said longitudinal stopping position is greater than the length of said determined runway, and as long as such is the case;

and, preferably, alarm means (audible and/or visual).

Furthermore, in a preferred embodiment, said automatic determination device which is intended to automatically determine a runway of the airport (which is provided with a plurality of runways) in the landing phase, advantageously comprises:

first means for automatically determining, in a landing phase, for each of said runways of the airport, the coordinates of the threshold of the corresponding runway, and its orientation;

second means for repetitively checking whether a characteristic height which depends on the current altitude of the aircraft and on the altitude of the airport is located within a predetermined height-wise detection window;

third means for repetitively computing, immediately said characteristic height is located within said detection window, for each of said runways, an angular difference between the geographic orientation of the corresponding runway and a straight line passing through the current position of the aircraft and the threshold of this runway, by taking into account the information determined by said first means, these angular differences being computed for each runway repetitively, and this until said characteristic height is once again located outside of said detection window; and fourth means for determining one of said runways, by taking into account the angular differences computed by said third means.

BRIEF DESCRIPTION OF THE DRAWINGS

The figures of the appended drawing will clearly show how the invention can be implemented. In these figures, identical references denote similar elements.

DETAILED DESCRIPTION OF THE INVENTION

Figure 1:
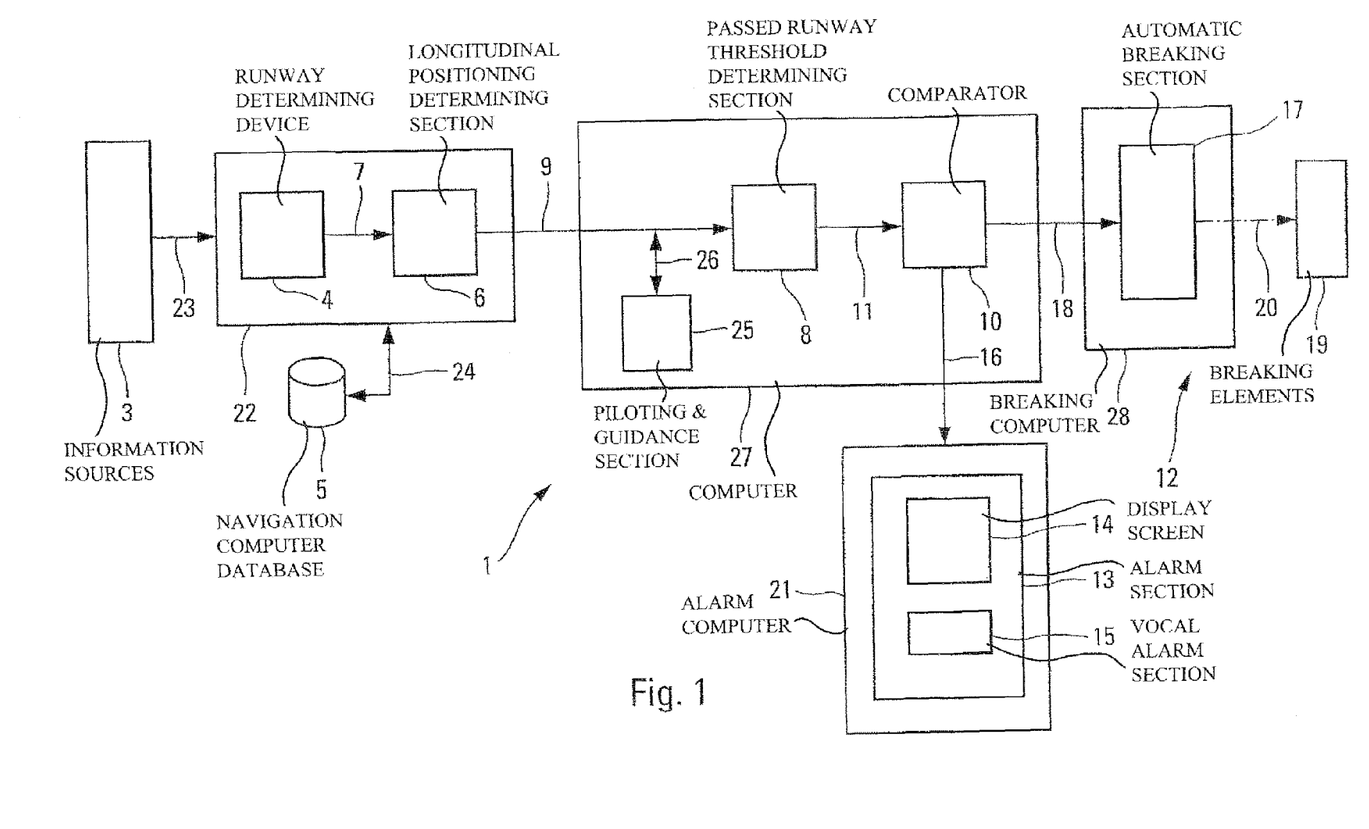
FIGS. 1 and 2 are block diagrams of a piloting aid system according to the invention, respectively in two different embodiments.
Figure 2:
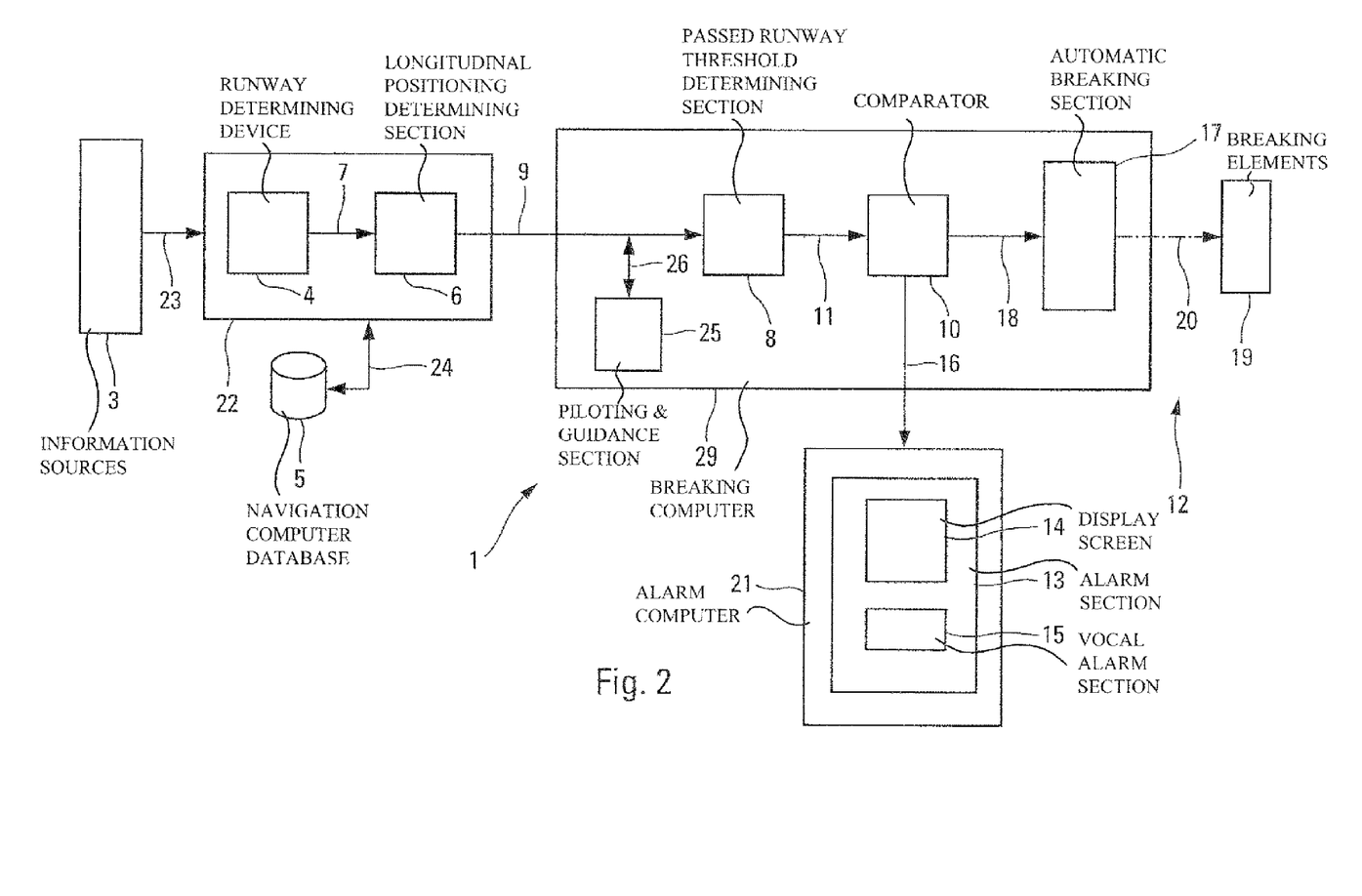

The system 1 according to the invention, and diagrammatically represented in two different embodiments in FIGS. 1 and 2, is intended to assist in the piloting of an aircraft A, in particular of a civilian transport aeroplane, in a landing phase comprising:

a final approach to an airport;
a landing proper on a runway 2 of this airport; and
a taxiing on this runway 2 after this landing.

Figure 3:
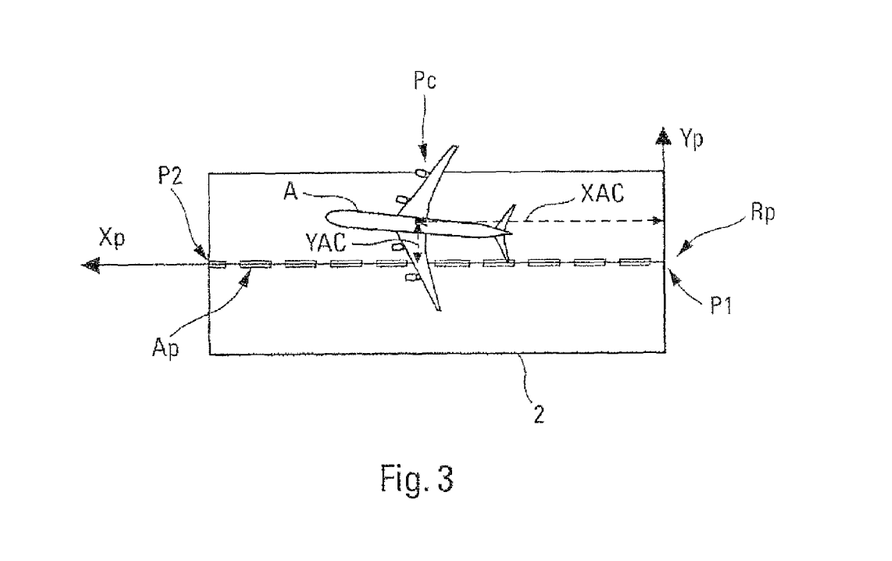
FIG. 3 diagrammatically illustrates a taxiing phase of an aeroplane on a runway in a landing phase.

According to the invention, said system 1 comprises, as represented in FIGS. 1 and 2:

a system 3 of standard information sources, which are able to determine the current values of the various parameters (position, altitude, etc.) of the aircraft, specified below;

a device 4 which will be specified hereinbelow with reference to FIG. 4 and which is formed in such a way as to be able to determine, automatically, a runway of the destination airport, in the landing phase, this destination airport being provided with a plurality of different runways;

a database 5 which includes characteristics specified hereinbelow of all the runways at least of the planned destination airport and which can be used to supply characteristics (specified hereinbelow) of the runway 2 determined by the device 4;

means 6 which are linked via a link 7 to said device 4 and which can determine the current longitudinal position Pc of the aircraft A, in a reference frame Rp linked to the determined runway 2 and represented in FIG. 3;

means 8 that are linked via a link 9 to said means 6 and which are formed in such a way as to determine, immediately the aircraft A passes the threshold P1 of said determined runway 2, from the current longitudinal position Pc determined by said means 6, a longitudinal stopping position XS of the aircraft A, as specified hereinbelow;

means 10 that are linked via a link 11 to said means 8 and that are intended to compare the longitudinal stopping position XS determined by said means 8 to the length LRWY of the determined runway 2; and means 12 specified hereinbelow for requesting a maximum braking of the aircraft A, if said longitudinal stopping position XS is greater than the length LRWY of the determined runway 2, that is, if there is a risk of longitudinal departure from the runway 2. Said means 12 request this maximum braking as long as this risk of longitudinal departure from the runway 2 remains.

This protection against a risk of departure from the runway is, preferably, activated after a predetermined time (corresponding to a confirmation time) after the means 10 have detected that the longitudinal stopping position XS is greater than the length LRWY of the runway 2.

This protection against a risk of departure from the runway can include, in addition to the generation of a maximum braking, the generation of an alarm to warn the crew.

To do this, the device 1 also includes alarm means 13 which can in particular generate a visual alarm, for example on a display screen 4 or via a light indicator not represented, and a vocal alarm, via standard means 15. These alarms can, in particular, urge the pilot or a member of the crew of the aircraft A to deploy without delay standard thrust reversers of said aircraft A, to bring them to their most effective, so-called "max reverse" position. When these thrust reversers are deployed, another visual and/or vocal message can take over to urge the pilot or a member of the crew to keep these thrust reversers deployed, and this given that the risk of longitudinal departure from the runway is established.

Thus, thanks to the invention, in cases where there is a risk of longitudinal departure from the determined and actually used runway 2, (that is, when the longitudinal stopping position XS of the aircraft A is greater than the length LRWY of this runway 2 and the stopping of the aircraft A therefore takes place, longitudinally, beyond the downstream end P2 of the runway 2), the device 1 makes it possible to apply a maximum braking of the aircraft A so as to avoid such a longitudinal departure. This maximum possible braking is defined according to the characteristics and capabilities of the aircraft A and is applied as long as the risk of departure from the runway remains.

In the context of the present invention, the maximum braking of the aircraft can be achieved manually. In this case, the device 1 prompts the pilot, for example via means 13, to generate a maximum braking of the aircraft A.

However, in a preferred embodiment, said maximum braking is applied automatically using standard automatic braking means 17. These braking means 17 are linked via a link 18 to said means 10 which are intended to activate them. Usually, said braking means 17 automatically determine a maximum braking command that they transmit to standard braking elements 19, in particular to the brakes of the aircraft A, as illustrated by a link 20 represented by chain-dotted lines.

Preferably, the maximum braking pressure (that corresponding to the maximum braking with pedals completely depressed) is requested upstream of an anti-skid system associated with said braking means 17 so as to avoid any locking of the wheels and obtain the most effective possible braking.

As indicated previously, if the thrust reversers are not deployed, the device 1 can issue (via the means 15) a repetitive audio message to urge the crew to deploy them without delay, via the throttle. This audio message can be complemented with a critical alarm of "master warning" type and a specific message on a centralized monitoring screen, for example of ECAM (Electronic Centralized Aircraft Monitoring) type. When the thrust reversers are activated, the preceding message is replaced by another audio message that is less intrusive but still repetitive, urging to keep them deployed, and this as long as the runway end overshoot situation is established. This message can be complemented with an intermediate "master caution" type alarm.

In a preferred embodiment:
said means 4 and 6 are part of a navigation computer 22 which is linked via a link 23 to said system 3 of information sources, and via a link 24 to said database 5 that is associated with it. This navigation computer 22 can be a flight management system (FMS) or an airport navigation system (ANS). If the navigation computer 22 is a flight management system, said database 5 is a standard navigation database, and if said navigation computer 22 is an airport navigation system, said database 5 is a standard airport database; and/or said alarm means 13, which generate the abovementioned alarms and messages, are part of a flight alarm computer 21 of FWC (Flight Warning Computer) type.

Furthermore, in the particular embodiment represented in FIG. 1:

said means 8 and 10, and the means 25 specified below, are part of a standard piloting and guidance computer 27, such as an automatic pilot; and said braking means 17 are part of a standard braking computer 28.

On the other hand, in the particular embodiment of FIG. 2, said means 8, 10, 17 and 25 are part of just one and the same standard braking computer 29.

The device 1 therefore also comprises said means 25 which are, for example, linked via a link 26 to said link 9 and which are intended to check whether the aircraft A is indeed landing on the runway 2 determined by said device 4. Since said means 25 are part of a computer 27 or 29 which is independent of the navigation computer 22, the device 1 can check the likelihood of the runway 2 determined by said device 4 (which is integrated in said navigation computer 22) by independent means, which is a way of increasing the reliability of the determination. Said means 25 thus make it possible to enhance the dependability of the protection against a risk of departure from a runway.

For this, said means 25 have:

the magnetic orientation of the runway 2 (QFU) which is either obtained from the database 5 or computed in the manner specified hereinbelow;

the lateral position of the aircraft A (ordinate) in the orthonormal reference frame Rp linked to the runway 2, which is determined as specified hereinbelow;

the current radio-altimetric altitude of the aircraft A, which is measured by standard means that are part of the system 3 of information sources; and the current magnetic heading followed by the aircraft A, which is also measured by standard means that are part of the system 3 of information sources.

Said means 25 check, when the aircraft A reaches a given radio-altimetric height in the descent during the landing phase, for example at 500 feet (approximately 150 metres), whether:

the angular difference between the magnetic orientation of the determined runway 2 and the current magnetic heading of the aircraft A is greater than or not greater than a threshold given as an absolute value, for example 50; or if the metric difference of the lateral position relative to the axis Ap (represented by broken lines in FIG. 3) of the determined runway 2 [equal to the lateral position of the aircraft (ordinate) in the orthonormal reference frame Rp linked to the determined runway 2] is greater than or not greater than a threshold given as an absolute value, for example 300 metres.

In practice, it is assumed that the aircraft A is aligned on the axis Ap of the runway 2, under a height of 500 feet relative to the altitude of the actual runway 2. By the check implemented by said means 25, the device 1 can verify that the aircraft A is actually landing on the determined runway 2.

As indicated previously, the automatic determination of a runway 2 implemented by said device 4 makes it possible to initiate a request to the database 5. This request is used to recover the characteristics of the duly determined runway 2. Two types of characteristics then exist according to the type of database 5. More specifically:

A/ if said database 5 is a navigation database, it contains the latitude and longitude coordinates of the threshold Pi (upstream end) of the runway 2, and the length and magnetic orientation (QFU) of this runway 2;

B/ if the database 5 is an airport database, it contains the latitude and longitude coordinates of the threshold Pi of the runway 2, and the latitude and longitude coordinates of the end P2 (downstream end) of this runway 2 (FIG. 3).

The orientation of the runway 2 corresponds:

in the above case A, to the magnetic orientation of the runway 2 which is input, in the usual way, by the crew into the database 5 via a flight management system when preparing for the flight; and in the above case B, to the geographic orientation of the runway 2 which is computed from geographic coordinates of the runway 2 obtained from the airport database.

In this case B, this orientation QFU is computed from latitude and longitude coordinates according to the WGS 84 standard of the threshold P1 ($\lambda$THR, $\mu$THR) of the runway 2 and of the end P2 ($\lambda$END, $\mu$END) of the runway 2. This computation is such that:

-if $\sin(\mu END - \mu THR) < 0$, then $QFU = \arccos\left(\dfrac{\sin(\lambda END) - \sin(\lambda THR) \cdot \cos(LRWY)}{\sin(LRWY) \cdot \cos(\lambda THR)}\right)$ -if $\sin(\mu END - \mu THR) \geq 0$, then $QFU = 2\pi - \arccos\left(\dfrac{\sin(\lambda END) - \sin(\lambda THR) \cdot \cos(LRWY)}{\sin(LRWY) \cdot \cos(\lambda THR)}\right)$ In these expressions, LRWY is the length of the runway 2, in metres, computed as follows:

$$LRWY = 2R \cdot \arcsin\sqrt{\sin^2\left(\dfrac{\lambda THR - \lambda END}{2}\right) + \cos(\lambda THR) \cdot \cos(\lambda END) \cdot \sin^2\left(\dfrac{\mu THR - \mu END}{2}\right)}$$

with R being the radius of the Earth, in metres.

The means 6 can then compute the coordinates of the position of the aircraft A in the orthonormal reference frame Rp associated with the determined runway 2. The longitudinal position of the aircraft A on the runway 2 corresponds to the abscissa XAC of the position of the aircraft A in this orthonormal reference frame Rp, as represented in FIG. 3.

The lateral position of the aircraft A in the reference frame Rp (which presents a longitudinal axis Xp as abscissa and a lateral axis Yp as ordinate and which is defined relative to the threshold P1 of the runway 2) is computed from the following expressions:

$$\begin{cases} XAC = \rho AM \cdot \cos(\theta AM - QFU) \\ YAC = \rho AM \cdot \sin(\theta AM - QFU) \end{cases}$$

in which:

XAC is therefore the longitudinal position of the aircraft A in the reference frame Rp, expressed in metres;

YAC is the lateral position of the aircraft A in the reference frame Rp, expressed in metres;

ρAM is the distance of the aircraft A from the threshold P1 of the runway 2, expressed in metres;

θAM is the geographic heading of the aircraft A, expressed in degrees; and

QFU is the geographic heading of the runway 2, expressed in degrees, and obtained as specified hereinabove.

The distance ρAM of the aircraft A from the threshold P1 of the runway 2 is computed from the current coordinates {λAC, μAC} of the aircraft A, preferably of GPS type, and geographic coordinates {λTHR, μTHR} of the threshold P1 of the runway 2 (obtained from the database 5):

$$\rho AM = 2R \cdot \arcsin\sqrt{\sin^2\left(\frac{\lambda THR - \lambda AC}{2}\right) + \cos(\lambda THR) \cdot \cos(\lambda AC) \cdot \sin^2\left(\frac{\mu THR - \mu AC}{2}\right)}$$

The geographic heading θAM of the aircraft A is computed from GPS coordinates {λAC, μAC} of the aircraft A:

- if $\sin(\mu AC - \mu THR) < 0$, $$\theta AM = \arccos\left(\frac{\sin(\lambda AC) - \sin(\lambda THR) \cdot \cos(\rho AM)}{\sin(\rho AM) \cdot \cos(\lambda THR)}\right)$$

- otherwise, $\theta AM = 2\pi - \arccos\left(\frac{\sin(\lambda AC) - \sin(\lambda THR) \cdot \cos(\rho AM)}{\sin(\rho AM) \cdot \cos(\lambda THR)}\right)$ Moreover, immediately the aircraft A passes the threshold P1 of the runway 2, said means 8 determine the longitudinal stopping position of the aircraft A, by estimating the remaining distance to be travelled between the current longitudinal position Pc of the aircraft A (determined by said means 6) and the stopping of the aircraft A, to which is added the value of the current longitudinal position Pc of the aircraft A. To determine the longitudinal stopping position XS, said means 8 compute, initially, the estimate of the distance ΔXS remaining to be travelled until the aircraft A stops, based on the following expression:

$$\Delta XS = -VAC^2/(2 \cdot dVAC/dt)$$

in which:

VAC is the longitudinal speed of the aircraft A in the runway reference frame Rp, expressed in metres per second;

dVAC/dt is the longitudinal acceleration of the aircraft A in the runway reference frame Rp, expressed in metres per second squared.

The deceleration is assumed to be fixed between the crossing of the threshold Pi and the initiation of the braking (normally when the nose wheel of the aircraft A has touched the ground), then is equal to the deceleration measured by inertial units (forming part of the system 3) of the aircraft A throughout the braking phase.

This estimate ΔXS is permanently computed, from crossing the threshold P1 of the runway 2, and until the end of the landing sequence (stopping, deliberate disconnection of the braking system, evacuation of the runway 2 on taking an exit ramp, and so on).

In a second stage, the means 8 determine the longitudinal stopping position XS, based on the following expression:

$$XS = XAC + \Delta XS$$

in which:

XAC is the longitudinal position of the aircraft A in the runway reference frame Rp, expressed in metres; and ΔXS is the estimate of the distance (specified hereinabove) remaining to be travelled until the aircraft A stops, expressed in metres.

Moreover, in a particular embodiment, the device 1 can also include a man/machine interface (display, etc.), not represented, making it possible to position and display in real time a symbol illustrating the current position Pc of the aircraft A on an airport map displaying the determined runway 2, for example of "Electronic Moving Map" type. In this case, the longitudinal stopping position XS can also be represented by an appropriate symbol system on the airport map giving the crew an indication of the quality of the braking applied. As an example, the symbol system illustrating this position XS can be presented in the form of a bar which is orthogonal to the axis Ap of the runway 2, and which moves along this axis Ap. It can be red in case of a risk of departure from the runway, and green if there is no risk of departure from the runway.

Furthermore, said means 10 assess the risk of departure from the runway 2, by comparing the longitudinal stopping position XS (estimated by said means 8) to the length LRWY of the runway 2. To do this, said means 10 compute the difference Δ between the length LRWY (obtained from the database 5) of the runway 2 and the longitudinal stopping position XS, computed by the means 8:

$$\Delta = LRWY - XS$$

If this different Δ is positive, the means 10 conclude that there is no overrun of the end P2 of the runway 2, therefore no risk of longitudinal departure from the runway. On the other hand, if the difference Δ is negative, said means 10 detect a risk of longitudinal departure from the runway.

Moreover, the device 4 which is used to automatically determine a runway 2 of an airport provided with a plurality of runways can, in the context of the present invention:

either be used as such, to automatically determine this runway 2;

or be associated with manual determination means (not represented), which a crew member can use to manually determine a runway. In this case, the aim of the device 4 is to automatically determine a runway 2 which is compared to a manually determined runway, in order to be able to confirm this manual determination. If there is a disagreement between a manual determination and an automatic determination, means (not represented) of the device 1 provide for the automatic determination implemented by the device 4 to take precedence.

Figure 4:
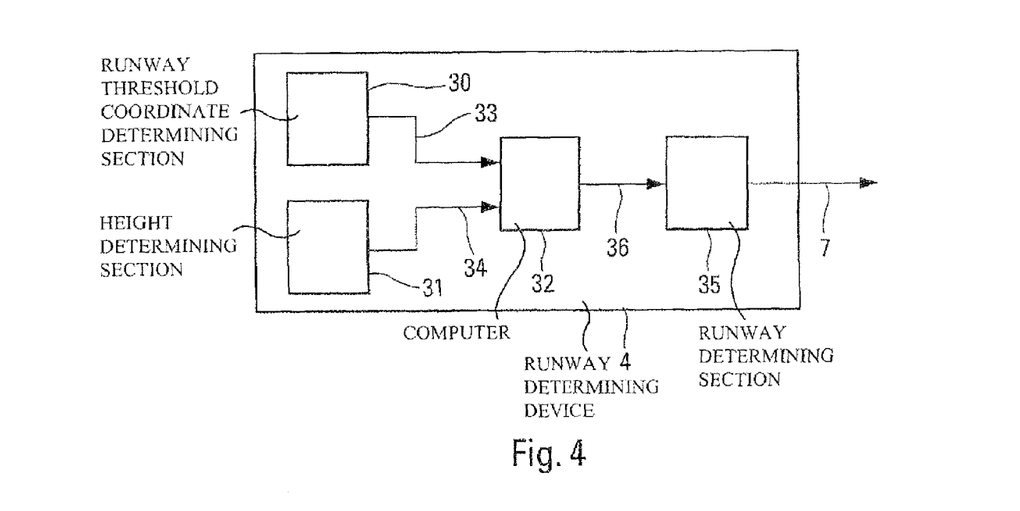
FIG. 4 is the block diagram of a device for automatically detecting a runway which is part of a piloting aid system according to the invention.

As represented in FIG. 4, said device 4 comprises, in a preferred embodiment:

means 30 for automatically determining, in a landing phase at an airport provided with a plurality of runways, coordinates of the thresholds of each of these runways, and their orientation QFU;

means 31 for repetitively checking whether a characteristic height HAC which depends on the current altitude of the aircraft A and the altitude of the airport is located within a height-wise detection window (predetermined);

means 32 which are linked via links 33 and 34 respectively to said means 30 and 31 and which are formed in such a way as to compute, repetitively, immediately said characteristic height HAC is located within said detection window, for each of said runways, an angular difference between the geographic orientation of the corresponding runway and a straight line passing through the current position of the aircraft A and the threshold of this runway. These computations take account of the information determined by said means 30. These angular differences are computed by the means 32 (for each runway), repetitively, and this until said characteristic height HAC is once again located outside of said detection window; and means 35 which are linked via a link 36 to said means 32 and which are formed in such a way as to determine one of said runways, by taking account of the angular differences computed by said means 32, as specified hereinbelow, and to transmit it via the link 7.

Said means 30 receive information stored in the database 5 and they create a subdatabase of all the runways of the airport. As indicated previously, these runways are listed in the database 5:

in the case of an airport database, by the latitude and longitude coordinates of the threshold (upstream end) of the runway and of the end (downstream end) of the runway; and in the case of a navigation database, by the latitude ($\lambda$THR) and longitude ($\mu$THR) coordinates of the threshold of the runway and of its magnetic orientation QFU.

The means 30 then create a subdatabase of the database 5 (relating to the airport and provided with a number n of runways, n being an integer greater than or equal to 2) which is provided with n pairs of coordinates {$\lambda$THR, $\mu$THR}, QFU).

Consequently, in the case of a navigation database, this information is simply extracted from said database 5. On the other hand, in the case of an airport database, said means 30 must compute the orientation QFUk of each runway of index k. This computation is performed as follows:

$$-\forall k \in [1, n], \text{ if } \sin(\mu ENDk - \mu THRk) < 0,$$

$$QFUk = \arccos\left(\frac{\sin(\lambda ENDk) - \sin(\lambda THRk) \cdot \cos(LRWYk)}{\sin(LRWYk) \cdot \cos(\lambda THRk)}\right)$$

$$-\text{else, } QFUk = 2\pi - \arccos\left(\frac{\sin(\lambda ENDk) - \sin(\lambda THRk) \cdot \cos(LRWYk)}{\sin(LRWYk) \cdot \cos(\lambda THRk)}\right)$$

where LRWYk is the length of the runway, in metres, which is computed as follows:

$$LRWYk = 2 \cdot R \cdot \arcsin \sqrt{\sin^2\left(\frac{\lambda THRk - \lambda AENDk}{2}\right) + \cos(\lambda THRk) \cdot \cos(\lambda ENDk) \cdot \sin^2\left(\frac{\mu THRk - \mu ENDk}{2}\right)}$$

with R being the radius of the Earth (in metres).

Furthermore, said means 31 comprise:

a voter (not represented) which is formed in such a way as to determine, in real time, as the characteristic height HAC, the median value between the following values: Hp-Ha, Hra and H0, with:

Hp being the current baro-inertial altitude of the aircraft A (reference QNH), in feet;

Ha being the altitude of the airport (supplied by the database 5), in feet;

Hra being the current radio-altimetric altitude of the aircraft A, in feet; and

H0 being a predetermined height value, for example 10 000 feet (approximately 3 km); and means (not represented) for checking whether this characteristic height HAC is located in the detection window which is delimited by a predetermined minimum height value Hmin, for example 100 feet (approximately 30 metres), and by a predetermined maximum height value Hmax, for example 200 feet (approximately 60 metres).

Preferably, the means 31 can be used to generate a Boolean enabling a test phase applied by the means 32 and a determination phase applied by the means 35.

When the aircraft A is in approach phase, two situations can occur:

if HAC is greater than Hmax or less than Hmin, then it is outside the detection window and the (enabling) Boolean is set at 0;

otherwise, said Boolean is set at 1.

Said means 32 can be used to test, when the enabling Boolean is at 1, all the possible runways listed in the subdatabase created by the means 30. For this, said means 32 compute the angular difference $\xi k[i]$ (between the geographic orientation of the runway 2 and the orientation of a straight line passing through the threshold Pi of the runway 2 and the current position Pc of the aircraft A), for any runway of index k, at each computation pitch i of the device 4 (which is assumed to apply p computation steps while said Boolean is at 1), as follows:

$$-\forall k \in [1, n], \forall i \in [0, p], \zeta k[i] = \theta AMk[i] - QFUk$$

$$-\forall k \in [1, n], \forall i \in [0, p], \text{ if } \sin(\mu AC[i] - \mu THRk) < 0,$$

$$\theta AMk[i] = \arccos\left(\frac{\sin(\lambda AC[i]) - \sin(\lambda THRk) \cdot \cos(\rho AMk[i])}{\sin(\rho AMk[i]) \cdot \cos(\lambda THRk)}\right)$$

-otherwise, $$\theta AMk[i] = 2\pi - \arccos\left(\frac{\sin(\lambda AC[i]) - \sin(\lambda THRk) \cdot \cos(\rho AMk[i])}{\sin(\rho AMk[i]) \cdot \cos(\lambda THRk)}\right)$$

$$-\rho AMk[i] = 2R \cdot \arcsin \sqrt{\sin^2\left(\frac{\lambda THRk - \lambda AC[i]}{2}\right) + \cos(\lambda THRk) \cdot \cos(\lambda AC[i]) \cdot \sin^2\left(\frac{\mu THRk - \mu AC[i]}{2}\right)}$$

in which expressions:

$\lambda$THRk and $\mu$THRk are the latitude and longitude coordinates (WGS 84) of the threshold of said runway of index k;

$\lambda$C[i] and $\mu$AC[i] are the current latitude and longitude coordinates of the aircraft A; and R is the radius of the Earth.

The means 32 also compute the cumulative average over the detection window of these differences. In practice, assuming that during the time interval where the device 4 has the detection enabling Boolean at 1, this device 4 has calculated p values for each of these differences, then the cumulative average is given by the following formula:

$$\forall k \in [2, n], \overline{\zeta k} = \frac{1}{p+1} \cdot \sum_{i=0}^{p} \zeta k[i]$$

It will be noted that, in terms of implementation in the device 4 in which the automatic detection algorithm is located, it is easy to perform the computation of this cumulative average recurrently. In practice:

$$j = 0 \quad Sk[0] = \zeta k[0]$$

$$j = 1 \quad Sk[1] = \frac{1}{2} \cdot Sk[0] + \frac{1}{2} \cdot \zeta k[1]$$

$$\vdots$$

$$j = i \quad Sk[i] = \frac{i}{i+1} \cdot Sk[i-1] + \frac{1}{i+1} \cdot \zeta k[i]$$

$$\vdots$$

$$j = p \quad \overline{\zeta}k = \frac{1}{p+1} \cdot \sum_{i=0}^{p} \zeta k[i] = Sk[p]$$

The means 35 can finally be used to choose the most likely runway throughout this detection phase. In practice, immediately the enabling Boolean drops back again to 0, the most likely runway will be that for which the cumulative average is the lowest, which is expressed as follows:

$$\exists k0 \in [2, n], \overline{\zeta}k\,0 = \min_{k} \overline{\zeta}k$$

The runway 2 is therefore defined by a pair ({λTHRk0, μTHRk0}, QFUk0).

The invention claimed is:

1. A method to assist piloting an aircraft during a landing phase at an airport having a plurality of runways, the method comprising:
   a1) automatically determining, for each of the runways of the airport, the runway's orientation and coordinates of the runway's threshold;
   a2) repetitively computing, for each runway, the runway's threshold based on the coordinates and orientation determined for the runway;
   a3) automatically and repetitively checking whether a characteristic height, which depends on the current altitude of the aircraft and on the altitude of the airport, is located within a predetermined height-wise detection window,
      a3i) setting a Boolean value to 1 if the characteristic height is within the predetermined height-wise detection window, and
      a3ii) setting the Boolean value to 0 if the characteristic height is not within the predetermined height-wise detection window;
   a4) repetitively computing for each runway, only when the Boolean value is set to 1, an angular difference between the orientation of the runway and a straight line passing through the current position of the aircraft;
   a5) computing, for each runway, a cumulative average of all computed angular differences;
   a6) comparing all computed cumulative averages with all other computed cumulative averages;
   a7) selecting a runway whose cumulative average is lowest according to the comparisons;
   b) repetitively determining the current longitudinal position of the aircraft in a reference frame linked to the selected runway;
   c) upon the aircraft passing the computed threshold of the selected runway:
      c1) repetitively determining a longitudinal stopping position of the aircraft from the current longitudinal position, and
      c2) repetitively comparing the longitudinal stopping position to the length of the selected runway;
   d) applying maximum braking to the aircraft while the determined longitudinal stopping position is greater than the length of the selected runway, wherein:
   the angular difference is computed for any runway of index k, by taking into account an orientation θAMk which is computed from the following expressions:

-if $\sin(\mu AC - \mu THRk) < 0$, $$\theta AMk = \arccos\left(\frac{\sin(\lambda AC) - \sin(\lambda THRk) \cdot \cos(\rho AMk)}{\sin(\rho AMk) \cdot \cos(\lambda THRk)}\right)$$

-otherwise, $\theta AMk = 2\pi - \arccos\left(\frac{\sin(\lambda AC) - \sin(\lambda THRk) \cdot \cos(\rho AMk)}{\sin(\rho AMk) \cdot \cos(\lambda THRk)}\right)$ $$-\rho AMk = 2R \cdot \arcsin \sqrt{\sin^2\left(\frac{\lambda THRk - \lambda AC}{2}\right) + \cos(\lambda THRk) \cdot \cos(\lambda AC) \cdot \sin^2\left(\frac{\mu THRk - \mu AC}{2}\right)}$$

λTHRk and μTHRk are the latitude and longitude coordinates of the threshold of the runway of index k;
λAC and μAC are the current latitude and longitude coordinates of the aircraft; and
R is the radius of Earth.

2. The method of claim 1, further comprising issuing an alarm during a period the longitudinal stopping position is greater than the length of the selected runway.

3. The method of claim 1, further comprising comparing the selected runway to a runway manually determined by an operator so as to confirm a suitable runway for landing.

4. The method of claim 1, further comprising:
   presenting a variable symbol system, illustrating the longitudinal stopping position, on an airport map displayed by a display screen, wherein
   the symbol system depends on the difference between the longitudinal stopping position and the length of the selected runway.

5. The method of claim 1, further comprising checking, intermediate between steps (a7) and (c), that the aircraft is landing on the selected runway.

6. The method of claim 1, further wherein the orientation of each runway is determined from latitude and longitude coordinates of the runway's threshold and latitude and longitude coordinates of the end of the runway.

7. The method of claim 1, further wherein:
   the characteristic height is determined from the median value of the following values: Hp-Ha, Hra and H0, where:
      Hp is the current baro-inertial altitude of the aircraft,
      Ha is the altitude of the airport,
      Hra is the current radio-altimetric altitude of the aircraft, and
      H0 is a predetermined height value; and
   the detection window is delimited by predetermined minimum and maximum height values.

8. A system to assist piloting an aircraft during a landing phase at an airport having a plurality of runways, the system comprising:
   a first determining section that automatically determines, for each of the runways of the airport, the runway's orientation and coordinates of the runway's threshold;
   a first computing section that repetitively computes, for each runway, the runway's threshold based on the coordinates and orientation determined for the runway;
   a checking section that automatically and repetitively checks whether a characteristic height, which depends on the current altitude of the aircraft and on the altitude of the airport, is located within a predetermined height-wise detection window, wherein the checking section:
   sets a Boolean value to 1 if the characteristic height is within the predetermined height-wise detection window, and
   sets the Boolean value to 0 if the characteristic height is not within the predetermined height-wise detection window;
a second computing section that computes for each runway, only when the Boolean value is set to 1, an angular difference between the orientation of the runway and a straight line passing through the current position of the aircraft;
a third computing section that computes, for each runway, a cumulative average of all computed angular differences;
a first comparator that compares all computed cumulative averages with all other computed cumulative averages;
a selector that selects a runway whose cumulative average is lowest according to the comparisons;
a second determining section that repetitively determines the current longitudinal position of the aircraft in a reference frame linked to the selected runway;
a fourth computing section that, upon the aircraft passing the computed threshold of the selected runway:
   repetitively determines a longitudinal stopping position of the aircraft from the current longitudinal position, and
   repetitively compares the longitudinal stopping position to the length of the selected runway;
a braking system that applies maximum braking to the aircraft while the determined longitudinal stopping position is greater than the length of the selected runway, wherein:
the angular difference is computed for any runway of index k, by taking into account an orientation $\theta AMk$ which is computed from the following expressions:

- if $\sin(\mu AC - \mu THRk) < 0$, $$\theta AMK = \arccos\left(\frac{\sin(\lambda AC) - \sin(\lambda THRk) \cdot \cos(\rho AMk)}{\sin(\rho AMk) \cdot \cos(\lambda THRk)}\right)$$

- otherwise, $\theta AMk = 2\pi - \arccos\left(\frac{\sin(\lambda AC) - \sin(\lambda THRk) \cdot \cos(\rho AMk)}{\sin(\rho AMk) \cdot \cos(\lambda THRk)}\right)$, in which: $\rho AMk = 2R \cdot \arcsin$ $$\sqrt{\sin^2\left(\frac{\lambda THRk - \lambda AC}{2}\right) + \cos(\lambda THRk) \cdot \cos(\lambda AC) \cdot \sin^2\left(\frac{\lambda THRk - \lambda AC}{2}\right)}$$

$\lambda THRk$ and $\mu THRk$ are the latitude and longitude coordinates of the threshold of the runway of index k;
$\lambda AC$ and $\mu AC$ are the current latitude and longitude coordinates of the aircraft; and
R is the radius of Earth.

9. The system of claim 8, further comprising an alarm device that issues an alarm during a period the longitudinal stopping position is greater than the length of the selected runway.

10. An aircraft comprising the system of claim 8.

* * * * *